United States Patent [19]
d'Alayer et al.

[11] Patent Number: 5,054,016
[45] Date of Patent: Oct. 1, 1991

[54] AUTOMATIC DISC CENTERING MECHANISM

[75] Inventors: Stéphane M. A. d'Alayer, Genappe; Louis P. C. Agostini, Sint Pieters Leeuw, both of Belgium

[73] Assignee: Staar S.A., Belgium

[21] Appl. No.: 308,742

[22] Filed: Feb. 10, 1989

[30] Foreign Application Priority Data

Mar. 2, 1988 [BE] Belgium ............................. 8800239

[51] Int. Cl.5 ............................................. G11B 17/04
[52] U.S. Cl. .................................. 369/270; 369/77.1; 369/75.2
[58] Field of Search ............... 369/264, 270, 271, 282, 369/75.1, 75.2, 77.1, 77.2, 292

[56] References Cited

U.S. PATENT DOCUMENTS

| 4,498,162 | 2/1985 | Schatteman | 369/77.1 |
|---|---|---|---|
| 4,510,591 | 4/1985 | Schatteman | 369/77.1 |
| 4,523,306 | 6/1985 | Staar | 369/77.1 |
| 4,546,396 | 10/1985 | Schatteman | 360/96.5 |
| 4,561,084 | 12/1985 | Satake et al. | 369/75.2 |
| 4,570,194 | 2/1986 | Schatteman | 360/97 |
| 4,625,304 | 11/1986 | Kanamaru et al. | 369/75.2 |
| 4,674,079 | 6/1987 | Agostini | 369/77.1 |
| 4,839,880 | 6/1989 | D'Alayer de Costjenore | 369/75.2 |

Primary Examiner—Shoop, Jr. William M.
Assistant Examiner—David Martin
Attorney, Agent, or Firm—Leydig, Voit & Mayer

[57] ABSTRACT

A mechanism for centering discs of different diameters includes a generally flat plate containing a plurality of slots, a guide rotatably mounted on one side of the plate for rotation about the axis along which a disc is to be centered, at least three pins, each of which slidably engages one of the slots and protrudes through the plate for engaging the periphery of a disc to be centered, a separate linkage pivotally connected between each of the pins and the guide to coordinate the displacement of the pins in the slots according to the rotation of the guide, and a biasing spring urging the pins toward the ends of the slots closer to the axis. The centering mechanism is employed in a playback apparatus for records, particularly compact discs of different diameters.

20 Claims, 7 Drawing Sheets

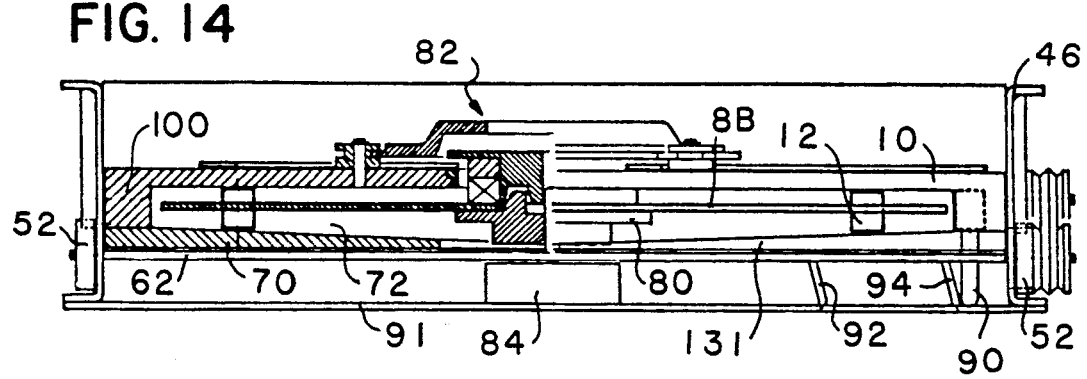
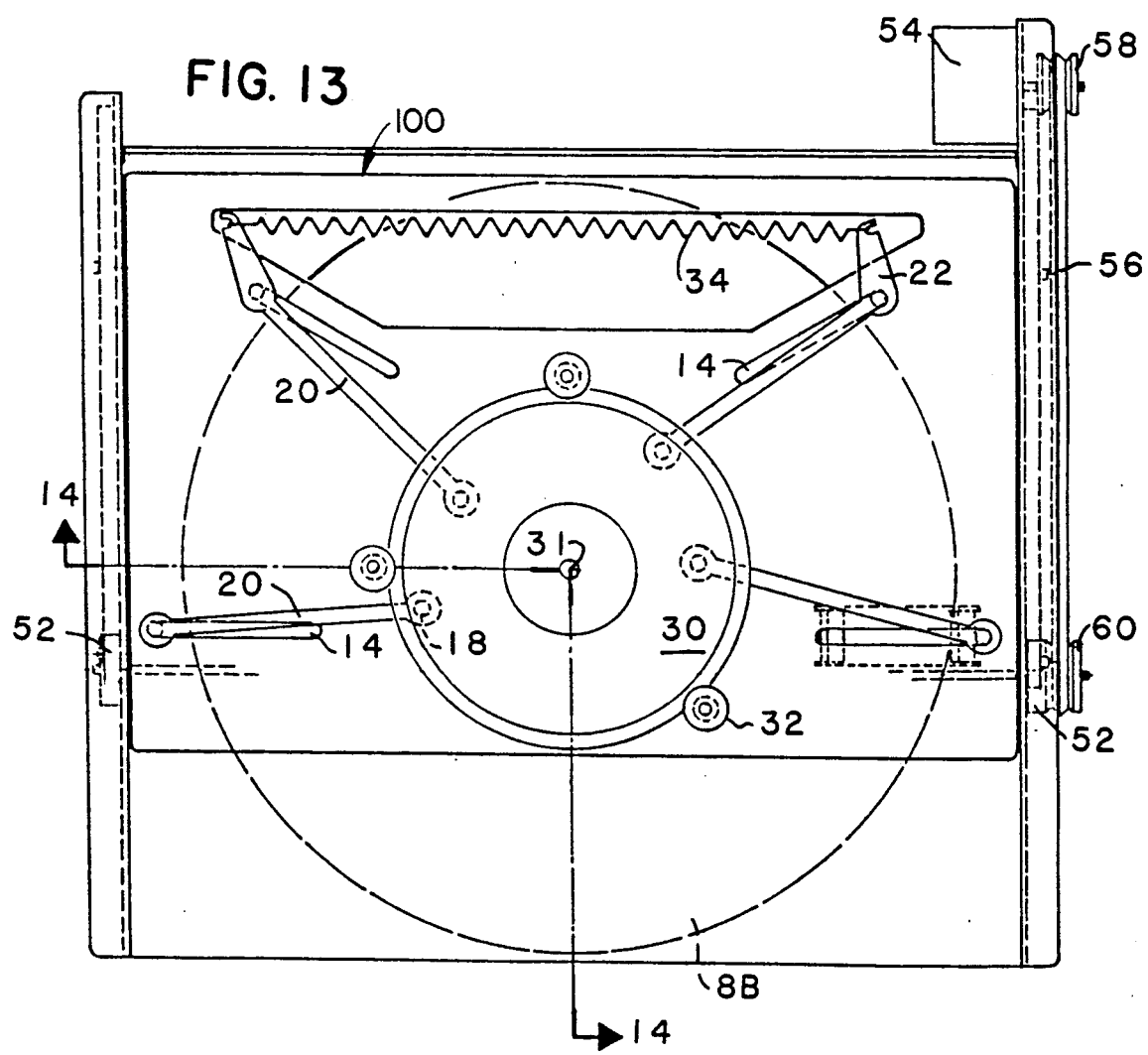

AUTOMATIC DISC CENTERING MECHANISM

TECHNICAL FIELD

This invention generally relates to mechanisms for centering discs of different diameters, particularly discs upon which information is recorded for subsequent retrieval. This invention is particularly useful in a playback apparatus for retrieving information recorded on discs of different diameters, such as compact discs, data discs, and the like. The invention also encompasses a playback apparatus including mechanisms for loading and unloading discs of different diameters and for retrieving information from a disc that has been loaded and centered.

BACKGROUND ART

Discs upon which information is recorded are well known. Sound records, generally referred to as compact disc records, in which information is retrieved through a light reflected from the record have become commercially popular. Those discs are susceptible to damage by improper handling. For that reason, various automatic mechanisms are generally employed for loading a compact disc into a playback apparatus. Examples of known mechanisms include drawers on which a compact disc is placed and pivoting doors containing a slot into which a compact disc is inserted. Typically, in these mechanisms, the drawer or door automatically closes, a spindle engages a central opening in the disc, and the disc is rotated for retrieving information from it. Generally, these known loading mechanisms occupy a relatively large volume reducing their utility in portable playback apparatus and in other applications where space is limited, such as in motor vehicles.

Recently compact discs of different diameters have become commercially available. The discs are produced in nominal diameters of eight and twelve centimeters. A playback apparatus desirably accepts discs of different diameters and plays them back without the use of special adaptors or other steps by the operator to indicate the disc size. A desirable playback apparatus automatically centers a disc, regardless of its diameter, and loads it into the playback position for retrieval of the recorded information.

DISCLOSURE OF THE INVENTION

Accordingly, it is a principal object of the present invention to provide a simple mechanism that occupies a relatively small volume for centering records of different diameters.

Another object of the invention is the provision of a playback apparatus employing the automatic centering mechanism that occupies a relatively small volume.

Another object of the invention is the provision of a disc centering mechanism that is simple in construction, reliable in performance, and rugged, as well as one that occupies a relatively small volume, for incorporation in a portable playback or other apparatus in which space is limited.

The centering mechanism according to the invention includes a generally flat plate containing a plurality of slots, a guide rotatably mounted on one side of the plate for rotation about the axis along which a disc is to be centered, at least three pins, each of which slidably engages one of the slots and protrudes through the plate for engaging the periphery of a disc to be centered, and a separate linkage pivotally connected between each of the pins and the guide to coordinate the displacement of the pins in the slots according to the rotation of the guide, the pins being biased toward the ends of the slots closer to the axis. A disc is inserted into the centering mechanism by sliding it along the plane of the disc so that the edge of the disc engages the pins, sliding them apart in their respective slots. The forces exerted on the edge of the disc by the spring-loaded pins causes the disc to be centered relative to the axis. In a preferred embodiment, the guide is an annular disc pivotally mounted on the plate by rollers that engage the outside edge of the guide. The angular rotation of the guide during the centering of a disc indicates the diameter of a centered disc. A protrusion on the guide may actuate another mechanism in a disc player in response to a predetermined angular rotation, i.e., an indicated disc size, or may itself be actuated in the rotation of the guide during the disc centering process.

A playback apparatus employing the centering mechanism also transports centered discs from a loading position to a playback position where the central opening of the disc is engaged by a spindle that rotates the centered disc. In a preferred transporting mechanism, a disc is raised or lowered to engage the spindle with the disc. In the raising or lowering of a centered disc for engagement with a spindle, the pins are disengaged from the periphery of the disc by cams so that the disc may be freely rotated for playback.

Other objects and advantages of the invention will become apparent from the detailed description that follows taken in conjunction with the drawing figures.

BRIEF DESCRIPTION OF THE DRAWINGS

FIG. 13 is a plan view of an embodiment of a playback apparatus according to the invention into which a relatively large diameter disc has been inserted, centered, and positioned for playback.

FIG. 14 is a front view, partially in section, of the apparatus of FIG. 13.

BEST MODE FOR CARRYING OUT THE INVENTION

Figure 1:
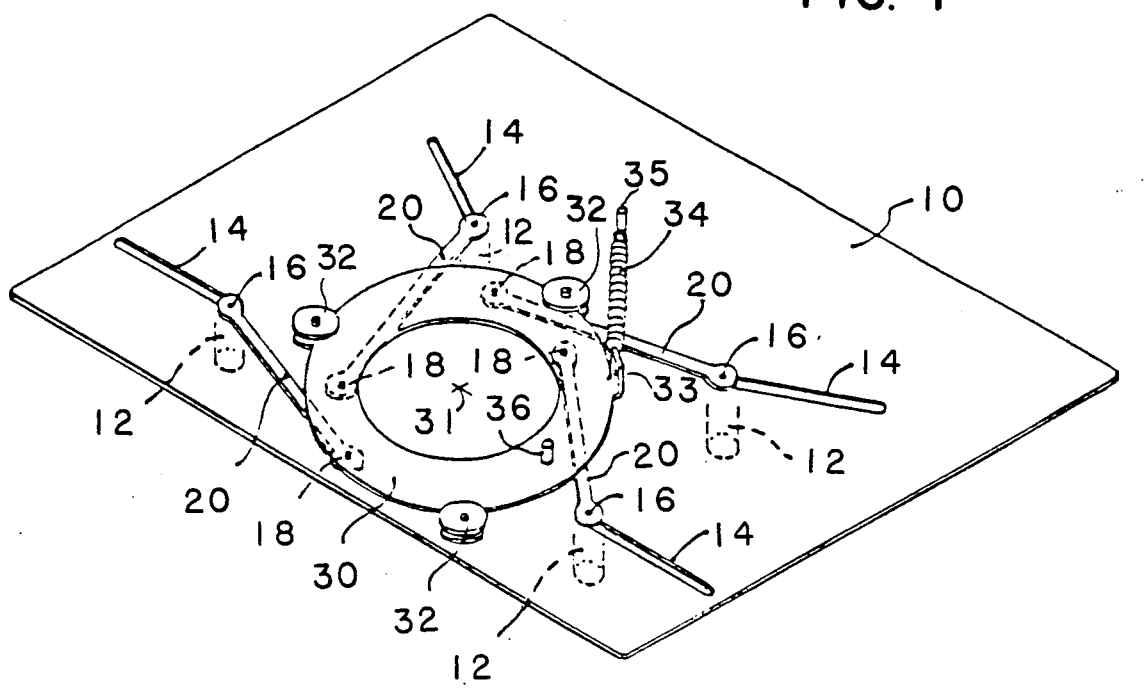
FIG. 1 is a perspective view of an automatic centering mechanism according to the invention.
Figure 2:
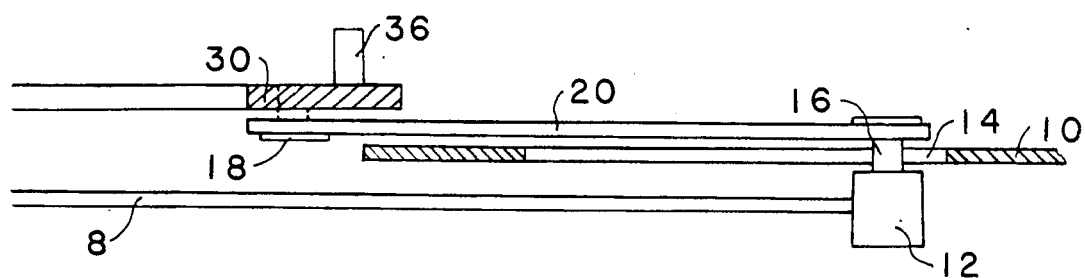
FIG. 2 is a front sectional view of a portion of the centering mechanism of FIG. 1.

An embodiment of the invention is shown in a perspective view in FIG. 1 and in a partial front view, partially in section, in FIG. 2. That embodiment is described with reference to both of those figures. The centering mechanism of FIGS. 1 and 2 centers a disc 8, which may be a compact disc audio record, a video disc, a memory disc on which digital or other encoded information is recorded, or another kind of generally circular disc that must be centered in order to carry out a subsequent operation. While the following description particularly emphasizes the employment of the invention for and in compact disc playback apparatus, the invention is not restricted to use with compact disc records.

The mechanism of FIGS. 1 and 2 employs a plate 10 having opposed first and second sides. Four pins 12 slidingly engage respective elongate slots 14 formed in the plate 10. The pins 12 protrude from one side of the plate 10 for engaging the edges of the disc 8. The pins 12 also extend from the opposite side of the plate 10 and each pivotally engages an end 16 of a connecting rod 20. The opposite end 18 of each connecting rod 20 is pivotally attached to a guide 30. The connecting rods 20 are arranged relative to the pins 12 and the guide 30 so that the guide can be rotated about a central axis.

In the embodiment of FIGS. 1 and 2, the guide 30 is an annular disc that is spaced from the plate 10 on the side opposite from that on which the pins 12 engage the edge of a disc 8. The guide 30 is rotatably mounted for rotation about a central axis 31. A disc 8 centered by the mechanism is centered with respect to the axis 31. Since the guide 30 is annular in the embodiment shown, it is not mounted on the plate 10 at a centrally disposed pin. Rather, the guide 30 is supported by three rollers 32 that engage the outside edge of the guide 30. The rollers 32 are substantially equally disposed around the periphery of the guide 30 and each of the rollers is rotatingly mounted on a pin that is fixed to the plate 10. Each of the rollers 32 includes a circumferential groove that engages the edge of the guide 30 to retain the guide in its desired position in the rollers and spaced from the plate 10.

A tab 33 extends from the guide 30 in a direction opposite from the plate 10. A helical spring 34 engages the tab 33 and a pin 35 that is mounted on the plate 10. The biasing force applied by the spring 34 urges the guide 30 to rotate about the axis 31. In the view of FIG. 1, the guide 30 is urged to rotate counterclockwise. A pin 36 also extends from the guide 30 in a direction away from the plate 10.

In operation, a disc 8 is inserted with a force applied in its plane so that its edge engages the pins 12. That is, a disc 8 disposed generally parallel to the plate 10 is translated parallel to the plate so that its edge contacts each of the pins 12. A further force is applied to the edge of the disc urging the pins 12 to slide in their respective slots 14. As the pins 12 slide in those slots, the connecting rods 20, which link the pins 12 with the guide 30, cause the guide to rotate clockwise, as viewed in FIG. 1. This clockwise rotation and the movement of pins 12 is resisted by the force applied by the spring 34. Once the center of the disc is aligned with the axis 31, the pins 12 reach equilibrium positions around the edge of a disc and no longer urge the disc out of the mechanism. Instead, the pins 12 hold the disc in place.

In the centering operation, the pin 36 is displaced by the rotation of the guide 30. The amount of the displacement of the pin 36 depends upon the diameter of the inserted disc. Thus, the pin 36 can be employed to indicate the diameter of a centered disc. The pin 36 may actuate an external device, such as a size indicator, through the rotation of the guide 30. Alternatively, the pin 36 may itself be driven by an external device to spread the pins 12, for example, to release a centered disc, or to prevent the spreading of the pins 12 and the insertion of a disc.

In the embodiment of FIGS. 1 and 2, the connecting rods 20 are pivotally attached to the side of the guide 30 that faces the plate 10. This arrangement is desired for stability; however, the connecting rods 20 could be pivotally attached to the opposite side of the guide 30. The slots 14 need not be linear, but may be arcuate or another shape. The pins 12 each preferably include a narrowed neck portion that slidingly engages a slot 14. A particularly useful configuration when only two different size discs are to be centered provides for centering of the smaller diameter discs when the pins 12 are near one end of the slots 14 and for centering of the larger diameter discs when the pins 12 are near the opposite ends of the slots 14. Such an arrangement is illustrated in the embodiments of the invention depicted in FIGS. 3–6.

Figure 4:
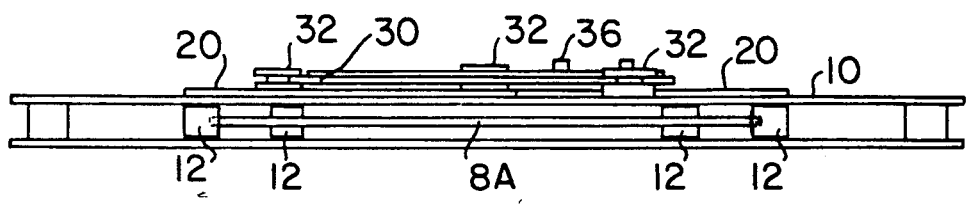
FIG. 4 is a front view of the mechanism of FIG. 3.
Figure 3:
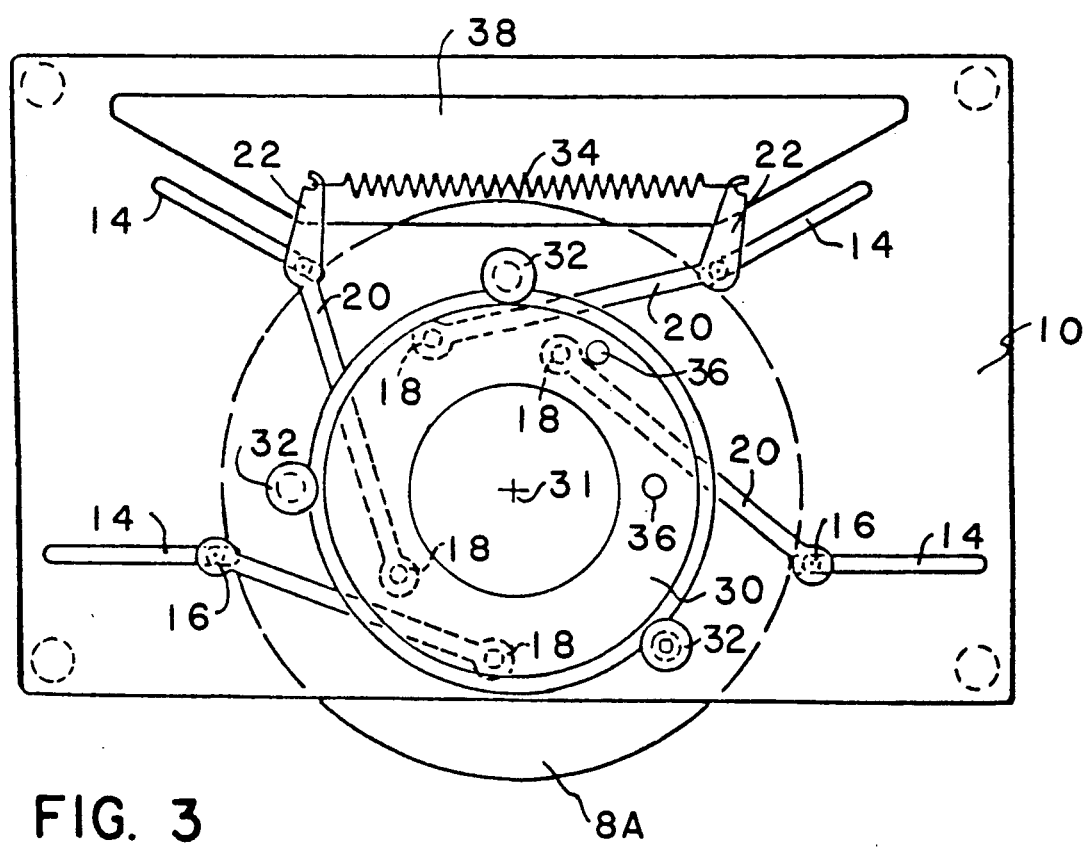
FIG. 3 is a plan view of an embodiment of a centering mechanism according to the invention into which a relatively small diameter disc has been inserted and centered.

Turning to FIGS. 3 and 4, a modified embodiment of the invention is shown in plan and front views, respectively, with a relatively small diameter disc 8A in its centered position. The centering mechanism of FIG. 3 is different from that of FIG. 1 in the manner in which the biasing force is applied to urge the pins 12 toward the ends of their respective slots 14 that are closer to the axis 31. In FIG. 3, a flange 22 is mounted on each of two of the pins 12 on the side of the plate 10 opposite the disc 8A. The flanges 22 are not pivoted, but are fixed to the ends of the respective pins 12. The spring 34 is attached to and stretched between the flanges 22 to apply the desired biasing force. The mechanism of FIG. 3 also includes an opening 38 in the plate 10.

As indicated in FIG. 3, when a relatively small diameter disc 8A is centered, the pins 12 are only slightly displaced from the ends of the slots 14 that they occupy in the absence of a disc. It is also apparent from FIG. 3 that, by repositioning the slots 14 and the pins 12, the centering mechanism could operate with as few as three pins 12 and slots 14. For added stability in the positioning of a centered disc, however, it is preferred that four pins and slots be employed.

Figure 6:
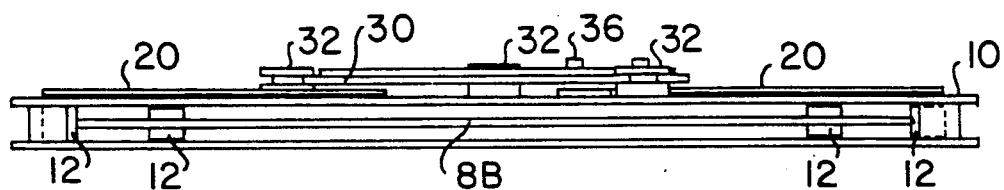
FIG. 6 is a front view of the mechanism of FIG. 5.
Figure 5:
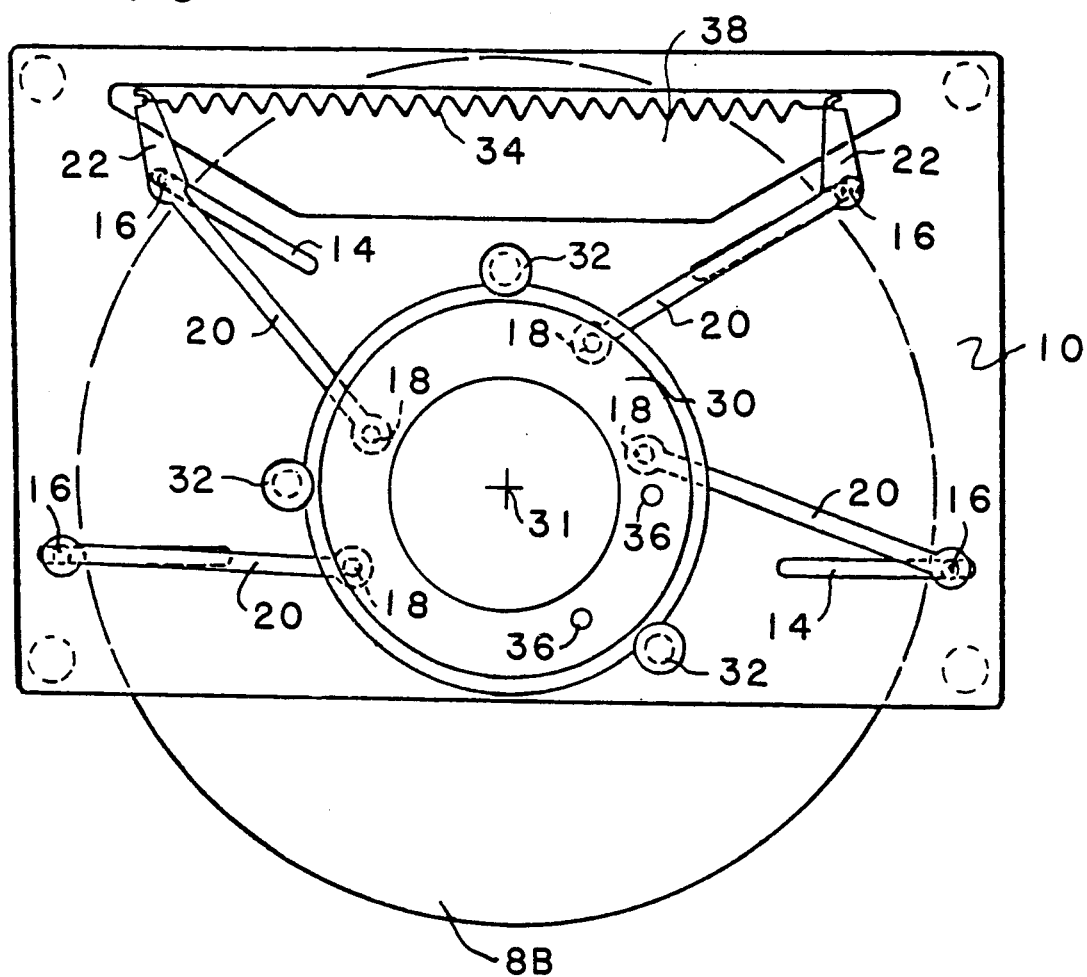
FIG. 5 is a plan view of an embodiment of a centering mechanism according to the invention into which a relatively large diameter disc has been inserted and centered.

In FIGS. 5 and 6, the centering mechanism embodiment of FIGS. 3 and 4 is again shown in plan and front views. However, in FIGS. 5 and 6, a relatively large diameter disc 8B is shown centered in the mechanism. The insertion of the larger diameter disc extends the spring 34 much more in FIGS. 5 and 6 than in FIG. 3. As a result, a somewhat larger force is required to insert a larger diameter disc than is required to insert a smaller diameter disc. As indicated in FIG. 5, the pins 12 are pushed by the disc 8B to near the most remote ends of their respective slots 14. The pins 12 are not held at the extreme ends of the slots by the disc 8B. Rather, some additional length of the slots 14 is provided for disengaging the pins 12 from the edge of the centered disc 8B, for example, for rotation and playback of the disc, as described below.

Figure 8:
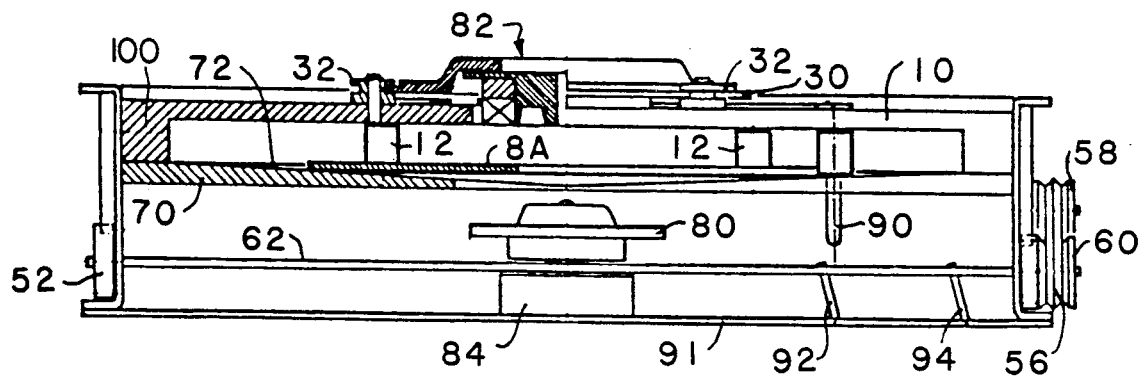
FIG. 8 is a front view, partially in section, of the apparatus of FIG. 7.
Figure 7:
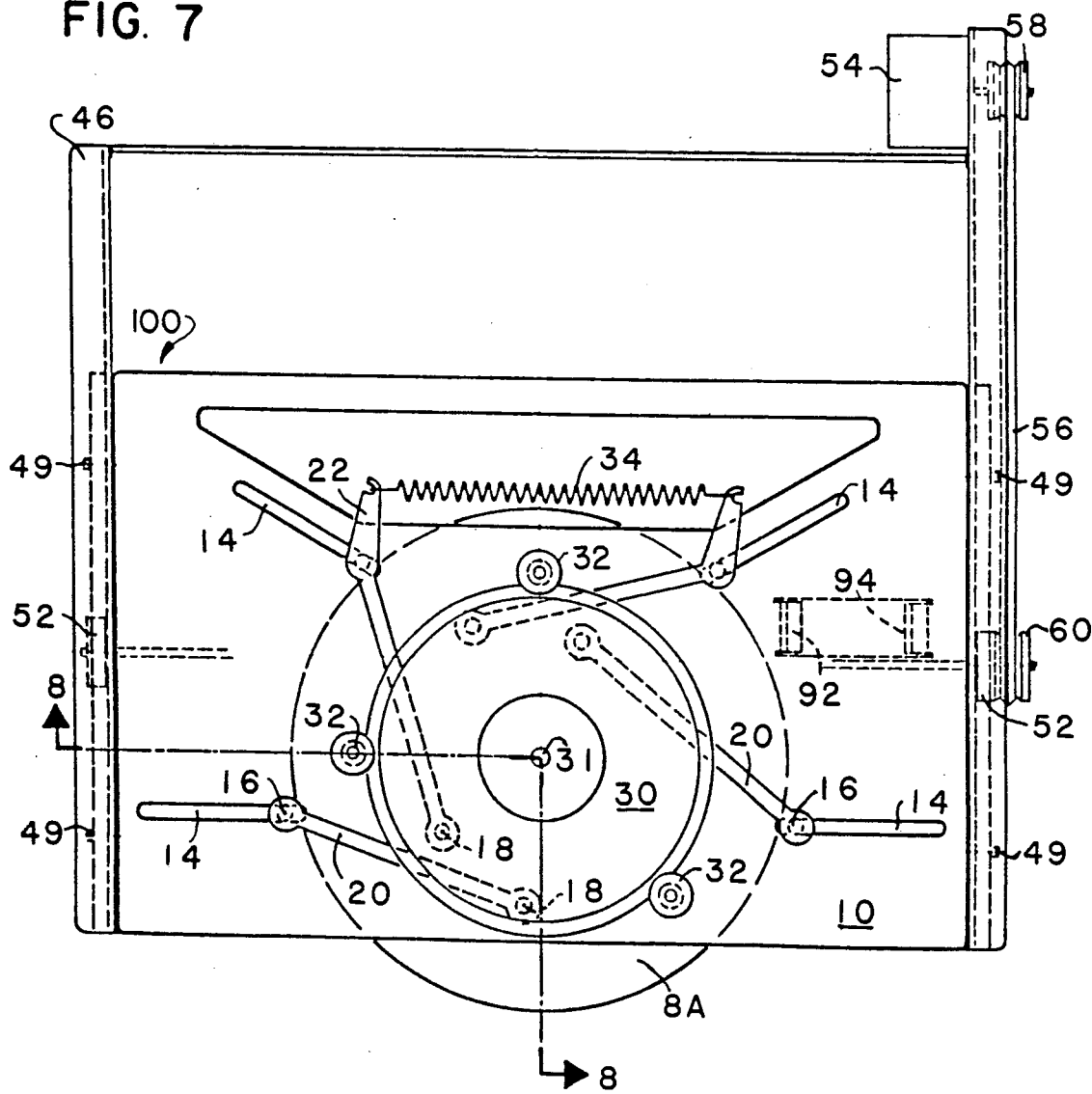
FIG. 7 is a plan view of an embodiment of a playback apparatus according to the invention into which a relatively small diameter disc has been inserted and centered.
Figure 9:
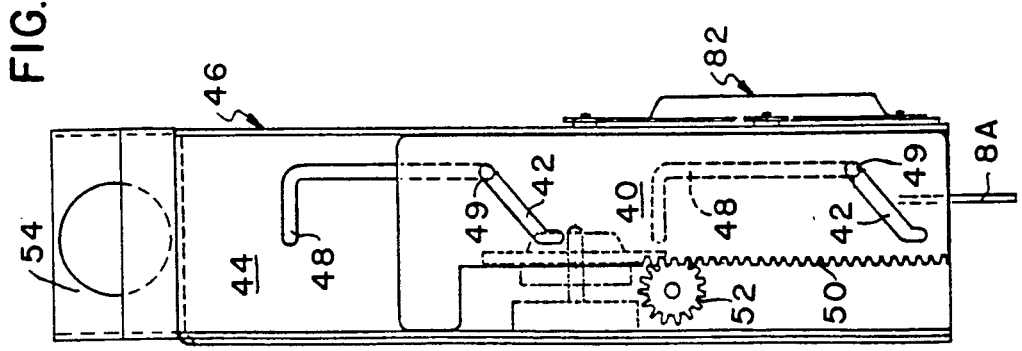
FIG. 9 is a left side view of the apparatus of FIG. 7.

FIGS. 7, 8, and 9 show an embodiment of the novel centering mechanism incorporated in a disc playback apparatus according to another embodiment of the invention. The playback apparatus is shown in plan view in FIG. 7, in front view in FIG. 8, which is partially sectioned along the line 8—8 of FIG. 7, and in a side view, from the left side of FIG. 7, in FIG. 9. In all figures like elements are given the same reference numbers.

In FIG. 7 a relatively small diameter disc 8A is centered about the axis 31 in the centering mechanism, just as shown in FIG. 3. However, unlike FIG. 3, the plate 10 is, in FIGS. 7-9, a movable housing 100 that can be transported between the loading (and unloading) position illustrated in FIG. 7 and a playback position described in reference to FIGS. 13-15. The movable housing 100 is mechanically connected to a pair of transverse members 40, one of which is shown in FIG. 9. Each transverse member 40 includes a pair of oblique slots 42. The transverse members 40 are slidably disposed adjacent to respective side plates 44 that are part of a frame 46 of the playback apparatus. The plates 44 include generally L-shaped slots 48. The slot pairs 42 and 48 are linked by pins 49 that are fixedly mounted in the movable housing 100 and that slidably engage respective pairs of the slots 42 and 48. The movable housing 100 can be translated relative to the frame 46 through the slidable engagement of the pins 49 in the respective pairs of slots.

The transverse members 40 each include on a surface a rack 50. Each of the racks 50 is engaged by a gear 52, a gear being disposed on each of the opposite sides of the frame 46. When the gears 52 are driven, the movable housing 100 is moved from the loading position of FIGS. 7-9 to the playback position of FIGS. 13-15. In that movement, the transverse members 40 slide along the frame 46 as a result of the turning of the gears 52. The movable housing 100 is translated, initially toward the top of FIG. 7, and then downwardly in FIG. 8, to the playback position. Discs are returned from the playback position to the loading position in the reverse sequence. These translations are driven by a motor 54 mounted on the frame 46 and a belt 56 that engages a pulley 58 mounted on the shaft of the motor 54 and a pulley 60 which is part of one of the two gears 52. The two gears 52 disposed on opposite sides of the frame 46 are mounted on a common axle 62. The structure of the transport mechanism is like that described in commonly assigned U.S. Pat. No. 4,546,396, the disclosure of which is incorporated herein by reference.

As already discussed, a disc recording is inserted into the centering mechanism by a sliding motion with the edge of the disc engaging the pins 12 and spreading them apart. Many records, particularly compact discs, are susceptible to damage if improperly handled. Preferably, the discs are handled only by their edges to avoid damage. In a preferred embodiment of the playback apparatus, a support 70 for sliding a disc recording into and out of the playback apparatus includes a V-shaped floor 72. The support 70 and the floor 72 are best seen in FIG. 8. As shown in that figure, a disc 8A contacts the floor 72 only at the edge of the disc. With the minimized physical contact, maximum protection against scratching or other damage to the disc is provided. The preferred support floor is further described in commonly assigned U.S. Pat. No. 4,510,591, the disclosure of which is incorporated herein by reference.

The playback apparatus includes a spindle assembly for engaging a central opening in the disc 8A and for rotating the disc. A preferred spindle assembly includes a spindle 80 that engages a magnetically actuated clamping device 82. A motor 84 turns the spindle 80. The apparatus of FIGS. 7, 8, and 9 is shown in the loading position so that the spindle 80 is not engaging the disc 8A. When the movable housing 100 is translated to the playback position, its pins 49 traverse the L-shaped slots 48. In the latter part of that traversal, the movable housing 100 descends towards the motor 84. The centered opening of the disc 8A is brought into alignment with the axis of rotation of the spindle 80 before that descent. Accordingly, at the end of the descent, the central opening of the disc 8A engages the spindle 80. In the same movement, the clamping mechanism 82 is brought into close proximity with the spindle 80. As a result of that proximity, the path of the magnetic flux flowing in the magnetic clamping device is altered and the clamp is brought into firm contact with the outer rim of the spindle thereby firmly engaging the disc 8A. A magnetic clamping device of the preferred type is described in U.S. Pat. No. 4,570,194, the disclosure of which is incorporated herein by reference.

Rotation of the clamped disc by the motor 84 and the spindle 80 cannot take place so long as the pins 12 continue to engage the periphery of the disc. The pins 12 include projections 90 extending beyond the movable housing 100 on the side of the frame including the guide 30. The playback apparatus includes a floor 91 from which project obliquely oriented, generally planar cam followers 92 and 94. The cam followers are located to engage the projections or cams 90 when the movable housing 100 descends in the direction of the spindle 80. The obliquely oriented cam followers urge a corresponding pin 12 away from the axis 31 to release a centered disc as it is clamped onto the spindle 80. The two cam followers 92 and 94 are shown in the embodiment illustrated for a playback apparatus used with discs of only two different diameters. If discs of additional diameters are employed, additional cam followers would be required. Likewise, the cam followers 92 and 94 are shown in FIGS. 7 and 8 only with respect to one cam 90 extending from one pin 12. Similar cams may be employed on each of the pins 12 and corresponding cam followers on the floor 91 are provided in order to release each of the pins engaging the periphery of a disc. When a disc is being returned from the playback position to the loading position, as the movable housing 100 rises from the spindle 80, the cam followers allow the pins 12 to move toward the axis 31 and again engage the disc to hold it for its transport to the loading position.

The playback apparatus takes advantage of the annular structure of the guide 30. Because of the central opening in the annular guide 30, the spindle 80 can be inserted into and withdrawn from the central opening of the guide 30 in order to engage and disengage a disc.

Figure 12:
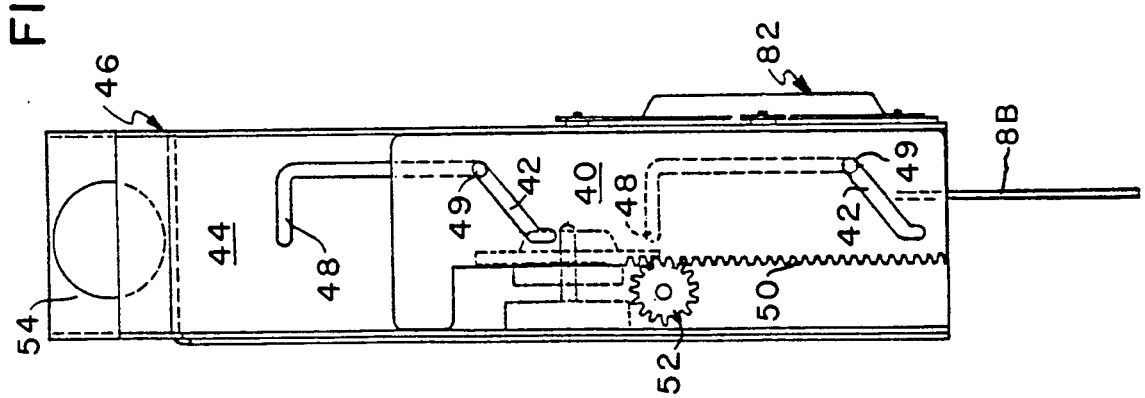
FIG. 12 is a left side view of the apparatus of FIG. 10.
Figure 11:
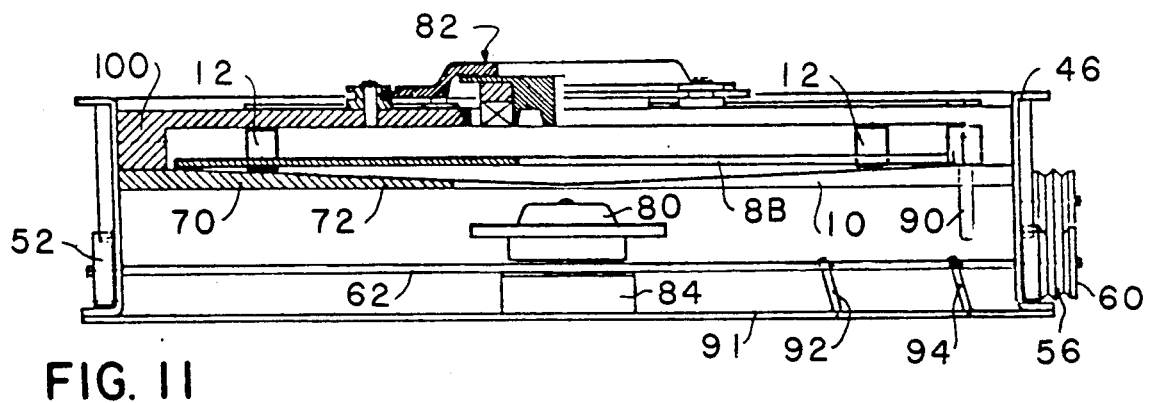
FIG. 11 is a front view, partially in section, of the apparatus of FIG. 10.
Figure 10:
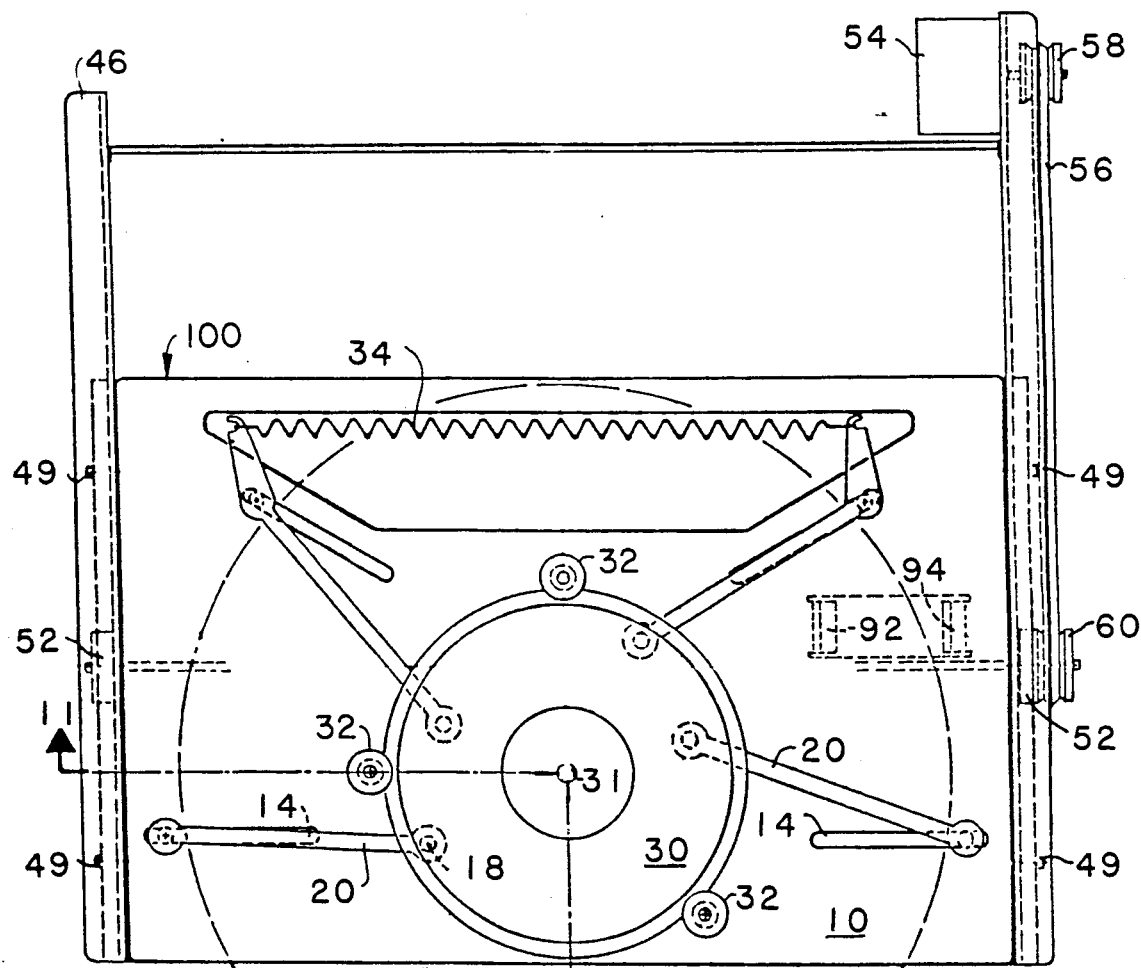
FIG. 10 is a plan view of an embodiment of a playback apparatus according to the invention into which a relatively large diameter disc has been inserted and centered.

FIGS. 10, 11, and 12 are similar to FIGS. 7, 8, and 9 except that a relatively large disc 8B is centered in the apparatus. That larger disc changes the location of the pins 12 in the slots 14, the locations of the connecting rods 20, and the amount of the extension of the spring 34. In addition, the cam 90 is aligned with the cam follower 94 for releasing the disc 8B from the pins 12 for playback. Because of the similarity between FIGS. 10, 11, and 12 and the previously described figures, further description of FIGS. 10, 11, and 12 is not necessary.

Figure 15:
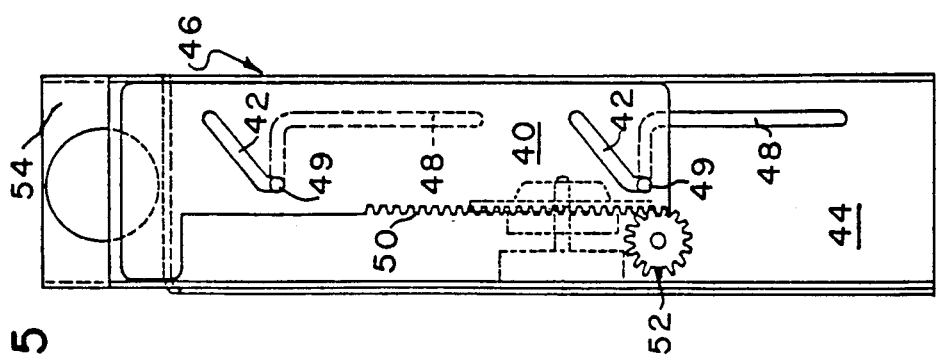
FIG. 15 is a left side view of the apparatus of FIG. 13.

FIGS. 13, 14, and 15 are identical to FIGS. 10, 11, and 12 except that in FIGS. 13, 14, and 15 the disc 8B is shown in the playback position. As already described, in that position the transverse members 44 have been translated in the direction of the motor 54 resulting in the descent of the movable housing 100 toward the spindle 80. In FIG. 14, it can be seen that the spindle 80 has been inserted through the central opening of the guide 30 and has engaged the clamp 82 to grasp the disc 8B. Likewise, the cam 90 has been displaced to the right in FIG. 14 by the cam follower 94 releasing the disc 8B for rotation. Since the other elements of the figures are the same as those already described, further description of FIGS. 13, 14, and 15 is not necessary.

The centering mechanism described has few moving parts making it inexpensive and rugged. In addition, the parts do not occupy a large volume making the centering mechanism suitable for applications in which space is limited. The simplicity of the centering mechanism makes it reliable in operation. Moreover, the size and simplicity of the centering mechanism makes it readily usable with disc loading and drive components in playback apparatus for disc recordings.

The invention has been described with reference to certain preferred embodiments. Various modifications and additions within the spirit of the invention will occur to those of skill in the art. Accordingly, the scope of the invention is limited solely by the claims.

We claim:

1. A centering mechanism for centering discs of different diameters comprising:
    a plate having opposed first and second sides and containing at least three elongate slots, each slot having a first end proximate an axis along which discs are to be centered and extending generally radially to a second end remote from the axis;
    a guide rotatably mounted on the first side of said plate to rotate about the axis;
    at least three pins, each pin protruding through and being radially displaceable in one of the slots for engaging the periphery of different diameter discs on the second side of said plate;
    at least three links, each link being pivotally connected to said guide and connected between one of said pins and said guide, said guide coordinating radial displacement of said pins along said slots through a linkage including said links upon rotation of said guide for centering the different diameter discs; and
    biasing means for urging said pins toward the respective first ends of the slots.

2. The centering mechanism of claim 1 wherein said guide comprises an annular disc pivotally mounted on said plate.

3. The centering mechanism of claim 2 including rollers pivotally mounted on said plate and engaging the periphery of said guide to rotatably mount said guide.

4. The centering mechanism of claim 1 including four pins and four slots wherein each pin slidably engages a different one of the slots.

5. The centering mechanism of claim 1 wherein said linkage comprises a connecting rod having first and second linkage ends, said first linkage end pivotally engaging said guide and said second linkage end pivotally engaging one of said pins.

6. The centering mechanism of claim 1 wherein said biasing means comprises a spring connected between said guide and said plate for urging rotation of said guide relative to said plate.

7. The centering mechanism of claim 1 wherein said biasing means comprises a spring connected between two of said pins for urging rotation of said guide relative to said plate.

8. The centering mechanism of claim 1 wherein said guide includes at least one projection for engaging and actuating an external device in response to rotation of said guide.

9. The centering mechanism of claim 1 wherein said guide includes at least one projection for engagement by an external device and rotation of said guide for displacement of said pins.

10. A disc playback apparatus for transporting disc records of different diameters between loading and playback positions and for playing back the disc records in the playback position comprising:
    means for centering records of different diameters in a loading position including:
        a plate having opposed first and second sides and containing a plurality of elongate slots, each slot having a first end proximate an axis along which records are to be centered and a second end radially remote from the axis;
        a guide rotatably mounted on the first side of said plate to rotate about the axis;
        at least three pins, each pin protruding through and slidably engaging one of the slots for engaging the periphery of a record on the second side of said plate;
        a link connected between each of said pins and said guide, said guide coordinating displacement of said pins through a linkage including each link upon rotation of said guide; and
        biasing means for urging said pins toward said respective first ends of said slots;
    a loading mechanism for transporting a centered record proximate said plate between the loading position and a playback position; and
    means for engaging and rotating a centered record in the playback position.

11. The playback apparatus of claim 10 wherein said guide comprises an annular disc pivotally mounted on said plate.

12. The playback apparatus of claim 11 including rollers pivotally mounted on said plate and engaging the periphery of said annular disc to rotatably mount said guide.

13. The playback apparatus of claim 10 wherein said linkage comprises a connecting rod having first and second linkage ends, said first linkage end pivotally engaging said guide and said second linkage end pivotally engaging one of said pins.

14. The playback apparatus of claim 10 wherein said biasing means comprises a spring connected between said guide and said plate for urging rotation of said guide relative to said plate.

15. The playback apparatus of claim 10 wherein said biasing means comprises a spring connected between two of said pins for urging rotation of said guide relative to said plate.

16. The playback apparatus of claim 10 wherein said mechanism for transporting comprises a support member for manual sliding insertion and withdrawal of a record from said centering mechanism in the loading position, said support member including a V-shaped surface for supporting the record at its edge.

17. The playback apparatus of claim 10 wherein said loading mechanism comprises a housing for receiving a disc and having a frame, said frame including sides containing L-shaped slots, members slidably disposed on said frame adjacent said frame sides and including oblique slots, said housing including said plate being slidably disposed within said frame, pins extending from said housing and slidably engaging both the L-shaped and the oblique slots, and drive means for moving said members and said housing in unison in a path defined by the L-shaped and oblique slots between the playback and the loading positions.

18. The playback apparatus of claim 17 wherein said loading mechanism includes means for disengaging said pins from the edge of a centered record in said playback position.

19. The playback apparatus of claim 18 wherein said pins include cams extending on the first side of said housing and said means for disengaging includes cam followers extending from said frame for displacing said pins from the periphery of a centered record when said housing advances toward said playback position.

20. A centering mechanism for centering discs of different diameters comprising:
 a plate having at least three elongate slots generally, radially disposed relative to an exis along which discs are to be centered;
 a plurality of grooved rollers rotatably mounted on said plate;
 an annular disc mounted on said plate for rotating about the axis and peripherally retained in grooves of said grooved rollers;
 at least three pins, each pin protruding through and being slidably displaceably radially in one of the slots for engaging the periphery of a disc;
 a connecting rod connected between each of said pins and said annular disc, said annular disc coordinating radial displacement of said pins in the slots through a linkage including each connecting rod; and
 biasing means for urging said pins toward each other in the respective slots.

* * * * *

UNITED STATES PATENT AND TRADEMARK OFFICE
CERTIFICATE OF CORRECTION

PATENT NO. : 5,054,016

DATED : October 1, 1991

INVENTOR(S) : D'Alayer et al

It is certified that error appears in the above-identified patent and that said Letters Patent is hereby corrected as shown below:

Column 10, line 14, change "displaceably" to --displaceable--.

Signed and Sealed this

Twenty-eighth Day of June, 1994

*Attest:*

BRUCE LEHMAN

*Attesting Officer*  *Commissioner of Patents and Trademarks*